United States Patent
Mullins

(10) Patent No.: US 9,773,349 B2
(45) Date of Patent: Sep. 26, 2017

(54) ACTIVE PARALLAX CORRECTION

(71) Applicant: DAQRI, LLC, Los Angeles, CA (US)

(72) Inventor: Brian Mullins, Sierra Madre, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 14/184,523

(22) Filed: Feb. 19, 2014

(65) Prior Publication Data
US 2015/0235355 A1 Aug. 20, 2015

(51) Int. Cl.
| | |
|---|---|
| *G06T 19/00* | (2011.01) |
| *G06F 3/01* | (2006.01) |
| *G06K 9/00* | (2006.01) |
| *G02B 27/01* | (2006.01) |
| *G02B 27/00* | (2006.01) |

(52) U.S. Cl.
CPC ........ *G06T 19/006* (2013.01); *G02B 27/0093* (2013.01); *G02B 27/0101* (2013.01); *G02B 27/0172* (2013.01); *G06F 3/013* (2013.01); *G06K 9/00597* (2013.01); *G02B 2027/014* (2013.01); *G02B 2027/0138* (2013.01)

(58) Field of Classification Search
CPC .................................................. G06T 19/006
See application file for complete search history.

(56) References Cited

U.S. PATENT DOCUMENTS

| | | | |
|---|---|---|---|
| 4,836,670 A | 6/1989 | Hutchinson | |
| 6,943,754 B2 | 9/2005 | Aughey et al. | |
| 8,487,838 B2 | 7/2013 | Lewis et al. | |
| 2009/0310021 A1* | 12/2009 | Kondo | H04N 5/44513 348/564 |
| 2012/0113092 A1* | 5/2012 | Bar-Zeev | G02B 27/017 345/419 |
| 2013/0083003 A1 | 4/2013 | Perez et al. | |
| 2013/0106674 A1* | 5/2013 | Wheeler | G02B 27/017 345/8 |
| 2013/0241805 A1* | 9/2013 | Gomez | G09G 3/003 345/8 |
| 2014/0267400 A1* | 9/2014 | Mabbutt | G06T 19/006 345/633 |

(Continued)

FOREIGN PATENT DOCUMENTS

WO WO-2015126939 A1 8/2015

OTHER PUBLICATIONS

"International Application Serial No. PCT/US2015/016375, International Search Report dated May 13, 2015", 2 pgs.

(Continued)

*Primary Examiner* — Jeffery A Brier
(74) *Attorney, Agent, or Firm* — Schwegman Lundberg & Woessner, P.A.

(57) ABSTRACT

Techniques of active parallax correction are disclosed. In some embodiments, a first gaze direction of at least one eye of a user is determined. A determination about virtual content can then be made based on the first gaze direction, and the virtual content can be caused to be presented to the user based on the determination. In some embodiments, making the determination comprises determining a first location on a display surface at which to display the virtual content. In some embodiments, the virtual content can be caused to be displayed on the display surface at the first location.

13 Claims, 9 Drawing Sheets

(56) References Cited

U.S. PATENT DOCUMENTS

2014/0362201 A1* 12/2014 Nguyen .................. H04R 3/00
348/78

OTHER PUBLICATIONS

"International Application Serial No. PCT/US2015/016375, Written Opinion dated May 13, 2015", 6 pgs.
"International Application Serial No. PCT/US2015/016375, International Preliminary Report on Patentability dated Sep. 1, 2016", 6 pgs.

* cited by examiner

US 9,773,349 B2

ACTIVE PARALLAX CORRECTION

TECHNICAL FIELD

The present application relates generally to the technical field of data processing, and, in various embodiments, to methods and systems of active parallax correction.

BACKGROUND

Heads-ups display devices allow users to observe a scene while simultaneously seeing relevant virtual content that may be aligned (beneficially) to item, images, objects, or environments in the field of view of the device or user. However, existing heads-up display devices are unable to accurately project rendered computer graphics onto the human retina so that it is registered with the scene as the eye rotates in the orbit.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
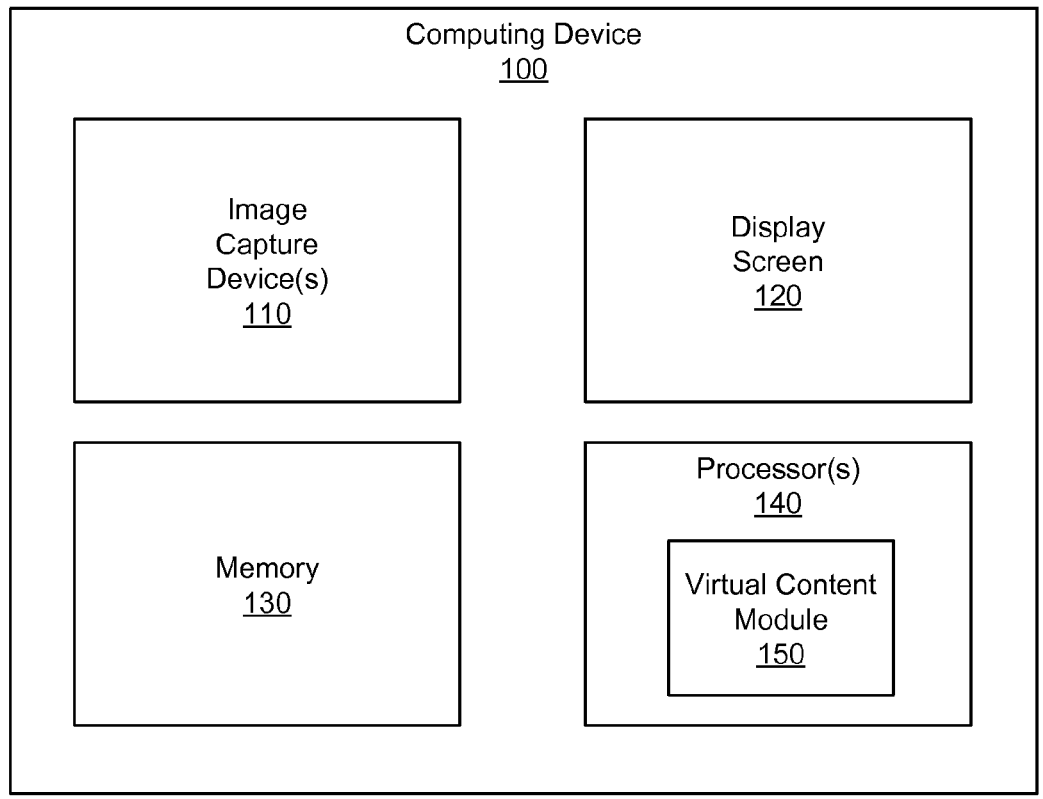
FIG. 1 is a block diagram illustrating a computing device, in accordance with some embodiments.

Example methods and systems of active parallax correction are disclosed. In the following description, for purposes of explanation, numerous specific details are set forth in order to provide a thorough understanding of example embodiments. It will be evident, however, to one skilled in the art that the present embodiments may be practiced without these specific details.

The present disclosure provides techniques for adjusting the display location of virtual content on a display surface based on a detected shift in the gaze direction of a user. In some embodiments, the corneal center of the user's eye(s) is estimated and used for the purpose of adjusting the projected light, which forms the virtual content, reflected off a display surface.

In some embodiments, a first gaze direction of at least one eye of a user is determined. A determination about virtual content can then be made based on the first gaze direction, and the virtual content can be caused to be presented to the user based on the determination.

In some embodiments, making the determination comprises determining a first location on a display surface at which to display the virtual content. In some embodiments, causing the virtual content to be present to the user comprises causing the virtual content to be displayed on the display surface at the first location.

In some embodiments, a second gaze direction of the at least one eye of the user is determined, where the second gaze direction is different from the first gaze direction. A second location on the display surface at which to display the virtual content can then be determined based on the second gaze direction, where the second location is different from the first location. The virtual content can then be caused to be displayed on the display surface at the second location.

In some embodiments, image data of real-world visual content is received. The image data can be image data that has been captured by an image capture device. The virtual content can be determined based on the received image data. In some embodiments, the determination of the first location is further based on a distance between the at least one eye and the display surface and a distance between the at least one eye and the real-world visual content. In some embodiments, determining the first location comprises: emitting at least one light ray from at least one light emitting diode towards the at least one eye; observing at least one glint reflected off of the at least one eye using at least one camera; determining a corneal center of the at least one eye based on the observed at least one glint; determining a path of incident light from the real-world visual content to the corneal center of the at least one eye; and adjusting positioning of at least one virtual content light ray forming the virtual content on the display surface to make at least one reflected light ray reflecting off of the display surface as a result of the at least one virtual content light ray coincident with the incident light ray from the real-world visual content.

In some embodiments, the display surface is transparent. In some embodiments, the display surface and the image capture device are coupled to a heads-up display device. In some embodiments, the heads-up display device comprises an optical head-mounted display device.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a computing device 100, in accordance with some embodiments. Computing device 100 may comprise a smart phone, a tablet computer, a wearable computing device, a vehicle computing device, a laptop computer, and a desktop computer. In some embodiments, computing device 100 comprises a heads-up display device. A heads-up display device is a device that provides a transparent display screen that presents content without requiring the user to look away from his or her usual viewpoint, such as with the user's head positioned up and looking forward, instead of angled down to look at a device. In some embodiments, the heads-up display device comprises an optical head-mounted display device, which may include, but is not limited to, a helmet mounted display device, glasses (e.g., Google Glass®), or other temporary or permanent form factors that can be either binocular or monocular. However, it is contemplated that other types of computing devices 100 are also within the scope of the present disclosure. In some embodiments, the computing device 100 comprises one or more image capture devices 110, a display screen 120, memory 130, and one or more processors 140.

In some embodiments, the image capture device(s) 110 comprises a built-in camera or camcorder with which a user of the computing device 100 can use to capture image data of visual content in a real-world environment (e.g., a real-world physical object). The image data may comprise one or more still images or video. As will be discussed in further detail herein, the image capture device(s) 110 can also be used to capture image data related to the positioning or orientation of at least one of the user's eyes, such as a gaze direction of the user's eyes (e.g., where the user is looking or the rotational position of the user's eyes relative to the user's head or some other point of reference). Other configurations of the image capture device(s) 110 are also within the scope of the present disclosure.

In some embodiments, the display screen 120 is configured to display the image data captured by the image capture device 110. In some embodiments, the display screen 120 is transparent or semi-opaque so that the user of the computing device 100 can see through the display screen 120 to the visual content in the real-world environment.

In some embodiments, a virtual content module 150 is stored in memory 130 or implemented as part of the hardware of the processor(s) 140, and is executable by the processor(s) 140. Although not shown, in some embodiments, the virtual content module 150 may reside on a remote server and communicate with the computing device 100 via a network. The network may be any network that enables communication between or among machines, databases, and devices. Accordingly, the network may be a wired network, a wireless network (e.g., a mobile or cellular network), or any suitable combination thereof. The network may include one or more portions that constitute a private network, a public network (e.g., the Internet), or any suitable combination thereof.

Figure 2:
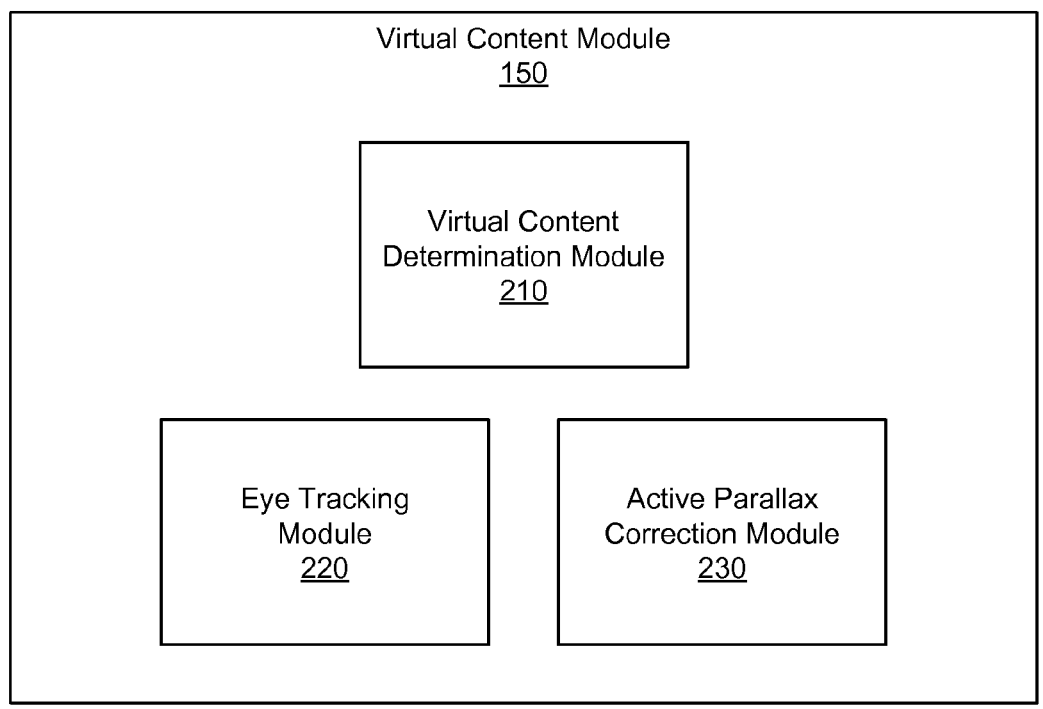
FIG. 2 is a block diagram illustrating a virtual content module, in accordance with some embodiments.

FIG. 2 is a block diagram illustrating components of virtual content module 150, in accordance with some embodiments. In some embodiments, virtual content module 150 comprises a virtual content determination module 210, an eye tracking module 220, and an active parallax correction module 230. Other configurations are also within the scope of the present disclosure.

In some embodiments, virtual content determination module 210 is configured to determine virtual content to be presented to a user. In some embodiments, the virtual content comprises visual content, such as computer graphics (e.g., still images, video, animation, etc.). Accordingly, the presentation of the virtual content can comprise the virtual content being displayed on display screen 120. The virtual content can be selected, or otherwise determined, from one or more sets of virtual content stored on the computing device 100 and/or from one or more sets of virtual content stored on one or more remote servers. In some embodiments, the virtual content module 150 is configured to provide an augmented reality experience over real-world visual content. Augmented reality provides a live, direct or indirect, view of a physical, real-world environment whose elements are augmented by computer-generated sensory input such as sound, video, graphics or GPS data. In some embodiments, the virtual content determination module 210 is configured to receive image data of real-world visual content (e.g., a real-world physical object), which may have been captured using image capture device(s) 110, and determine virtual content to be displayed on display screen 120 based on the image data of the real-world visual content.

In some embodiments, the virtual content comprises non-visual content. The virtual content can comprise audio content (e.g., music, speech, etc.). In some embodiments, the virtual content can comprise haptic feedback (e.g., applying forces, vibrations, motions, etc.).

In some embodiments, eye tracking module 220 is configured to determine a gaze direction of at least one eye of a user of the computing device 100. It is contemplated that eye tracking module 220 may employ any suitable eye tracking techniques, including, but not limited to, optical tracking techniques. In some embodiments, one or more image captured devices, such as image capture device(s) 110 can be used to capture image data used in any eye tracking techniques employed by the eye tracking module 220.

In some embodiments, active parallax correction module 230 is configured to determine a location on a display surface of the display screen 120 at which to display the virtual content. The active parallax correction module 230 can determine this location based on the determined gaze direction of the user's eye(s). In some embodiments, determining this display location comprises making an adjustment to an initial display location. For example, an initial display location for the virtual content on the display surface of the display screen may be initially determined. This initial display location can be determined based on a determined positioning of the computing device 100. For example the positioning of an optical head-mounted display device being used by the user relative to real-world visual content can be determined based on data captured by one or more image capture devices on the head-mounted display device, such as image data of the real-world visual content. An adjustment may then be made to this initial display location based on the determined gaze direction of the user, thereby resulting in a newly determined display location on the display surface at which to display the virtual content. Such an adjustment may comprise a shifting of the display of the virtual content from the initial display location to the newly determined display location. The active parallax correction module 230 can be further configured to cause the virtual content to be displayed at the determined location on the display surface of the display screen 120. In this respect, the active parallax correction module 230 can adjust the display location of virtual content based on a change in the gaze direction of the user in order to maintain fidelity from the user's changed perspective, thereby using the gaze direction as a refinement mechanism for the initially determined display location for the virtual content.

Figure 3A:
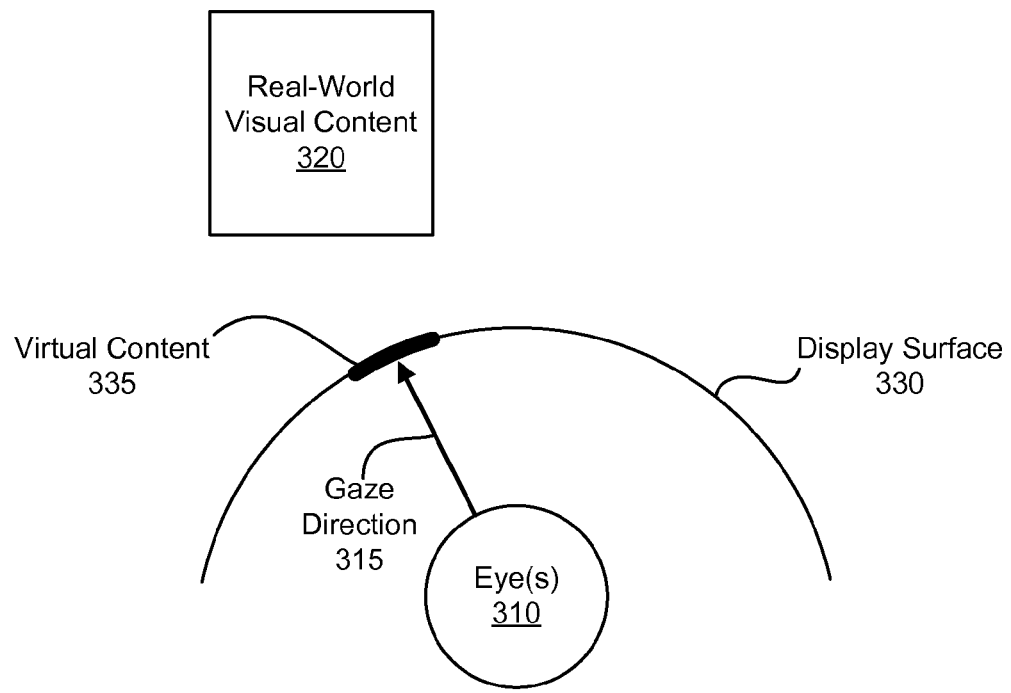
FIGS. 3A-3B illustrate an adjustment of a display location of virtual content based on a change in a gaze direction of a user, in accordance with some embodiments.
Figure 3B:
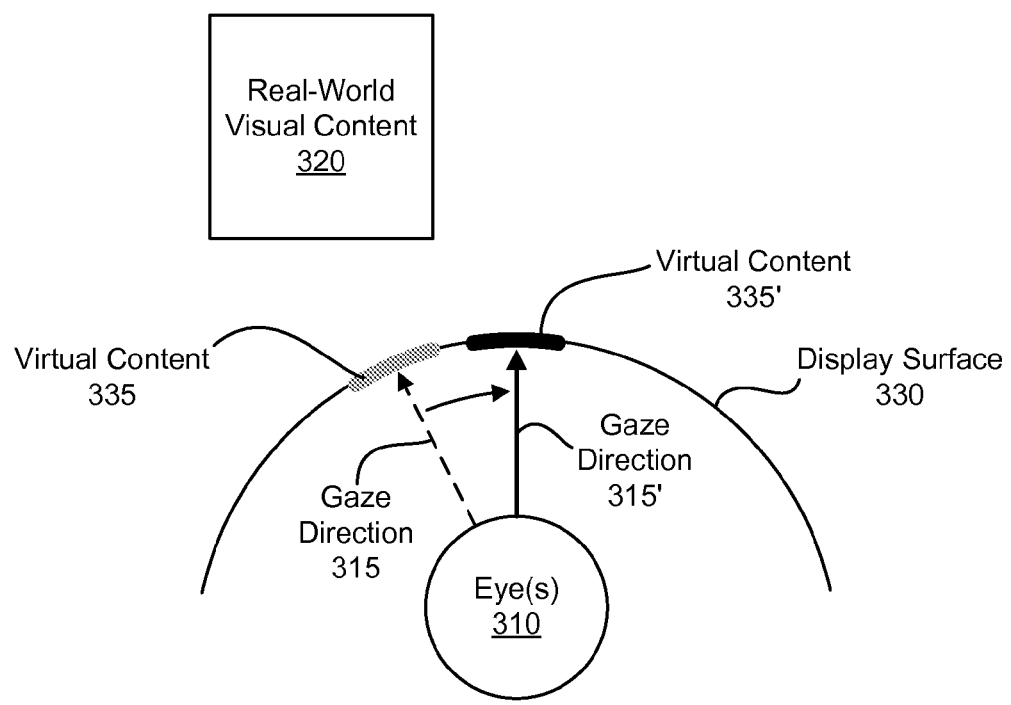

FIGS. 3A-3B illustrate an adjustment of a display location of virtual content based on a change in a gaze direction of a user, in accordance with some embodiments. FIG. 3A illustrates at least one of the user's eyes 310 looking through a display surface 330 at real-world visual content 320 along a first gaze direction 315. Virtual content 335 is caused to be displayed on display surface 330 at a first location based on the first gaze direction 315. As seen in FIG. 3B, the user's gaze direction may shift from the first gaze direction 315 to a second gaze direction 315'. Accordingly, the location at which virtual content 335 is caused to be displayed on display surface 330 can be shifted from the first location to a second location, as shown in FIG. 3B with the shifting of virtual content 335 from the first location to virtual content 335' at the second location. In some embodiments, virtual content 335' is identical to virtual content 335 (e.g., the same visual object with the same properties). In some embodiments, virtual content 335' is a modified version of virtual content 335 (e.g., the same visual object with different properties). In some embodiments, virtual content 335' is completely different from virtual content 335 (e.g., a different visual object).

Display surface 330 may be part of display screen 120 of computing device 100. In some embodiments, display surface 330 is curved, as shown in FIGS. 3A-3B. In some embodiments, display surface 330 is straight or flat (not shown). In some embodiments, display surface 330 may be one continuous display surface. In some embodiments, display surface 330 may be formed from two or more distinct display surfaces configured to work together. It is contemplated that other shapes and configurations of display surface 330 are also within the scope of the present disclosure.

Figure 4:
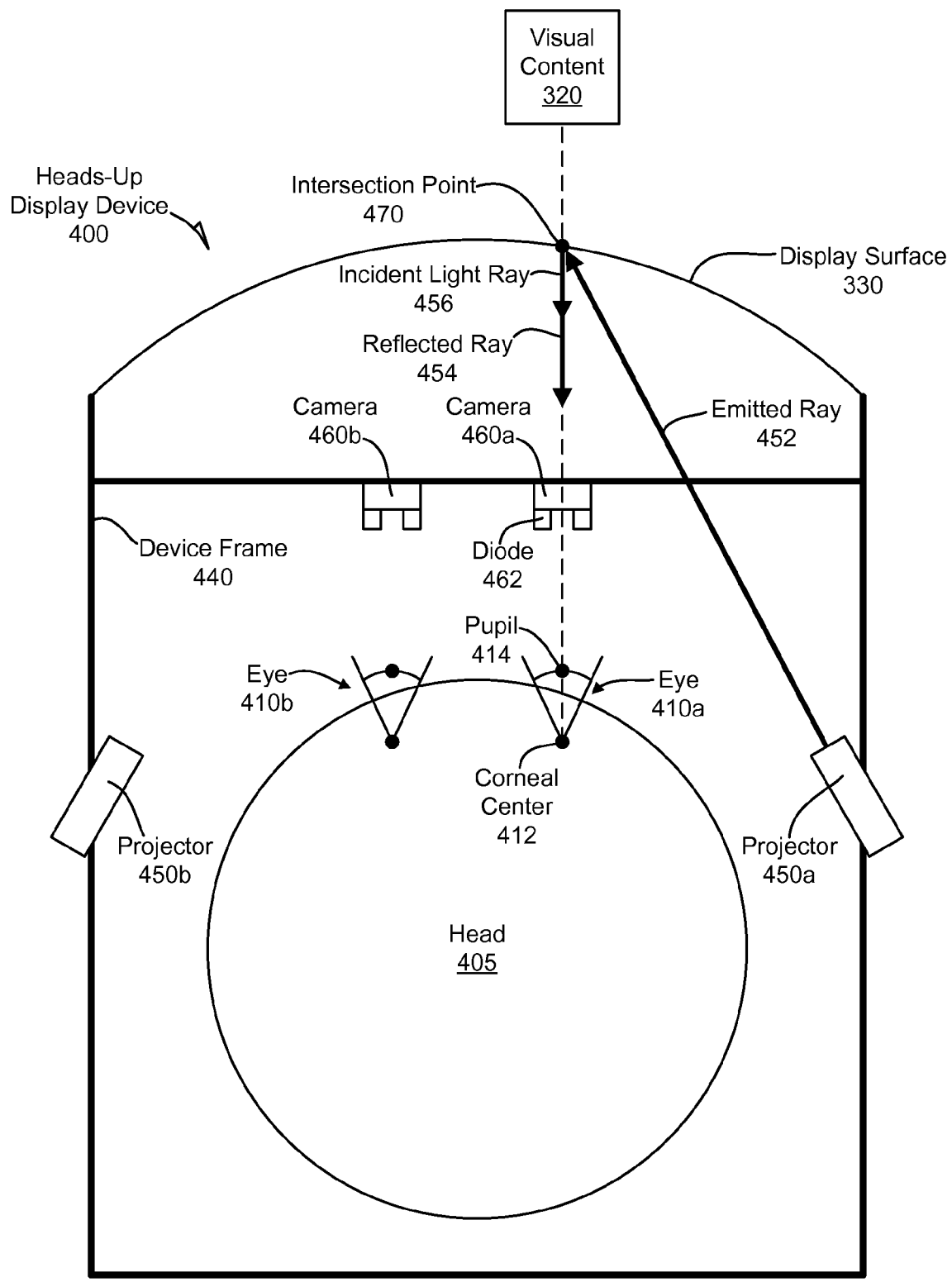
FIG. 4 illustrates a heads-up display device incorporating active parallax features, in accordance with some embodiments.

FIG. 4 illustrates a heads-up display device 400 incorporating active parallax features disclosed herein, in accordance with some embodiments. In some embodiments, heads-up display device 400 comprises a device frame 440 to which its components may be coupled and via which the user can mount, or otherwise secure, the heads-up display device 400 on the user's head 405. Although device frame 400 is shown in FIG. 4 having a rectangular shape, it is contemplated that other shapes of device frame 440 are also within the scope of the present disclosure.

The user's eyes 410a and 410b can look through a display surface 330 of the heads-up display device 400 at real-world visual content 320. Each eye has a corneal center 412 and a pupil 414. In order to make FIG. 4 easier to view, certain operations are shown as being performed with respect to eye 410a, but not eye 410b. However, corresponding operations can be performed with respect to eye 410b as well, either separately or in conjunction with eye 410a. In this fashion, eyes 410a and 410b can be treated separately on their own or together as a single combined unit.

In some embodiments, heads-up display device 400 comprises a stereo camera system comprising cameras 460a and 460b directed towards the user's eyes 410a and 410b, respectively. In other embodiments, one central eye tracking camera (not shown) may be employed. Each camera can be equipped with near-infrared band-pass filters, and can have paraxial near-infrared light emitting diodes 462. In some embodiments, the light emitting diodes 462 are placed near the optical centers of their respective cameras 460a and 460b. The cameras 460a and 460b can have near-infrared band-pass filters to capture the light from their respective near-infrared light emitting diodes 462.

In some embodiments, heads-up display device 400 also comprises two distal projectors 450a and 450b configured to emit light towards display surface 330. Display surface 330 can be configured to provide optical see-through (transparent) ability and reflectivity properties for the distal light projectors 450a and 450b. It is contemplated that other types, numbers, and configurations of light emitting projectors can also be employed and are within the scope of the present disclosure.

In FIG. 4, a stereo eye tracking system is being employed to estimate the corneal center 412 of eyes 410a and 410b. The eyes 410a and 410b can be modeled as two pinhole cameras. The estimated corneal center 412 of each eye 410a, 410b can then be used to direct light rays from the corresponding projector 450a, 450b so that emitted ray 452 reflects off display surface 330 such that the reflected ray 454 is coincident with the incident light ray 456 from real-world visual content 320, as shown in FIG. 4 with reflected ray 454 and light ray 454 being aligned along the same dotted line. Intersection point 470 represents the point of intersection of the light ray from visual content 320 with display surface 330.

In some embodiments, the near-infrared light emitting diodes 462 emit approximately paraxial light rays to the observing cameras 460a and 460b. The corneal eye surface of each eye 410a and 410b can be modeled by the eye tracking module 220 as a convex mirror. Convex mirrors have the property that an incident ray directed towards the center of curvature is reflected along the same ray. The emitted rays from the near-infrared light emitting diodes are reflected off the corneal surface (e.g., first Purkinje image) as glints, and are observed by the camera system. The glints are extracted from the stereo image pair and used by the eye tracking module 220 to triangulate the corneal center 412 of each eye 410a and 410b.

The distal light projectors 450a and 450b can emit visible light ray(s) 452 at display surface 330 in front of the eyes 410a and 410b. The emitted light ray(s) 452 is reflected off display surface 330 towards the eye as reflected ray 454. The emitted light ray(s) 452 can be adjusted by the active parallax correction module 230 to reflect off the projection surface so that the reflected light ray 454 is coincident with the incident light ray 456 from visual content 320 to the corneal center 412.

It is contemplated that other eye tracking techniques and visual content adjustment techniques can also be employed and are within the scope of the present disclosure. In some embodiments, one or more of the same image capture devices can be used to both capture image data of the real-world visual content and perform eye tracking operations. In some embodiments, the image capture device(s) used for capturing image data of the real-world visual content is/are different from the image capture device(s) used for performing the eye tracking operations disclosed herein. For example, one or more additional image capture devices (not shown) other than camera 460a and 460b can be employed to capture image data of the real-world visual content.

Figure 5A:
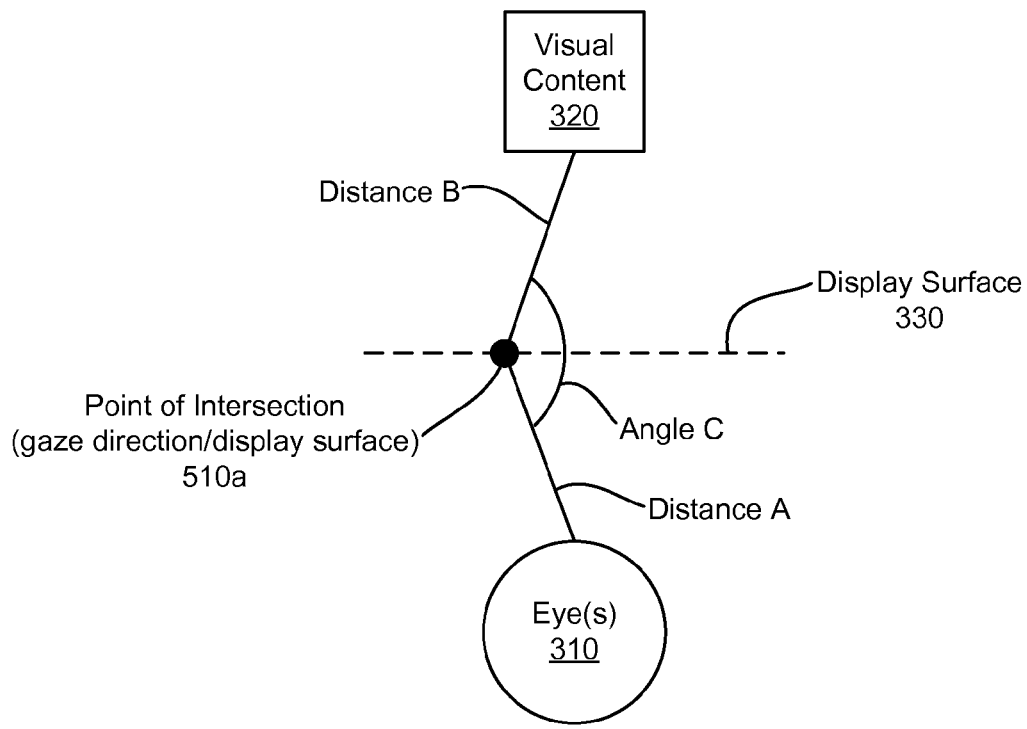
FIGS. 5A-5B illustrate parameters that can be used in employing active parallax correction in determining a display location of virtual content, in accordance with some embodiments.
Figure 5B:
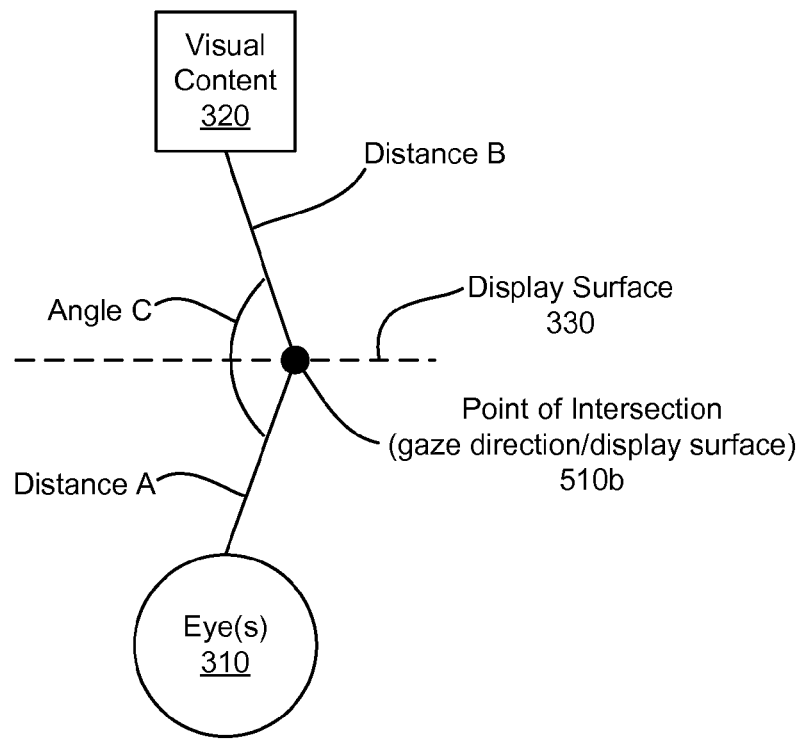

FIGS. 5A-5B illustrate parameters that can be used in employing active parallax correction in determining a display location of virtual content, in accordance with some embodiments. In FIG. 5A, the eye(s) 310 of a user are looking at real-world visual content 320 through display surface 330 along a first gaze direction (e.g., angled to the left). The first gaze direction intersects with display surface 330 at point of intersection 510a. In FIG. 5A, distance A represents the distance between the user's eye(s) and the point of intersection 510a, while distance B represents the distance between the visual content 320 and the point of intersection 510a. The angle between the lines representing distances A and B is represented as angle C. Similarly, in FIG. 5B, the eye(s) 310 of a user are looking at real-world visual content 320 through display surface 330 along a second gaze direction (e.g., angled to the right). The second gaze direction intersects with display surface 330 at point of intersection 510b. In FIG. 5B, distance A represents the distance between the user's eye(s) and the point of intersection 510b, while distance B represents the distance between the visual content 320 and the point of intersection 510*b*. The angle between the lines representing distances A and B is represented as angle C. Distances A and B, as well as angle C can be used as parameters by the active parallax correction module 230 in determining the location on the display surface 330 at which to cause the virtual content (e.g., virtual content 335 and 335' in FIGS. 3A-3B) to be displayed. It is contemplated that other parameters and configurations of parameters can be employed in determining the location on the display surface 330 at which to cause the virtual content to be displayed.

Figure 6:
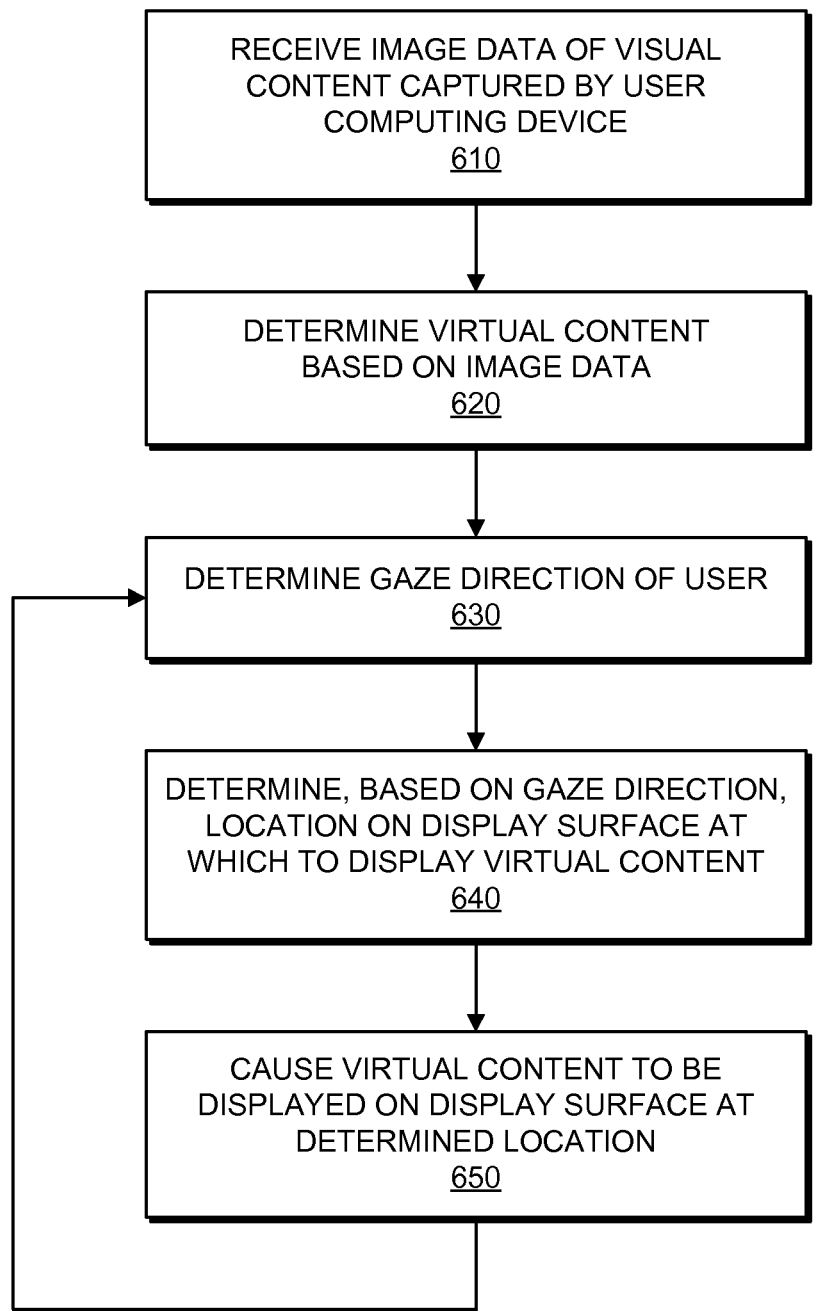
FIG. 6 is a flowchart illustrating a method of active parallax correction, in accordance with some embodiments.

FIG. 6 is a flowchart illustrating a method 600 of active parallax correction, in accordance with some embodiments. The operations of method 600 may be performed by a system or modules of a system (e.g., virtual content module 150 in FIGS. 1-2). At operation 610, image data of real-world visual content 320 can be received. The image data may have been captured by an image capture device. At operation 620, virtual content 335 to be displayed on a display surface 330 can be determined based on the received image data. At operation 630, a gaze direction of at least one eye of a user can be determined, such as by using the eye tracking techniques disclosed herein or any other suitable eye tracking techniques. At operation 640, a location on display surface 330 at which to display the virtual content 335 can be determined. At operation 650, the virtual content 335 can be displayed on the display surface 330 at the determined location. The method can repeat at operation 630, where the gaze direction of the user is once again determined and subsequently used in determining the location on the display surface 330 at which to display the virtual content 335. In this respect, the display location of the virtual content 335 can be adjusted based on a detected change in the gaze direction of the user. It is contemplated that the operations of method 600 may incorporate any of the other features disclosed herein.

Figure 7:
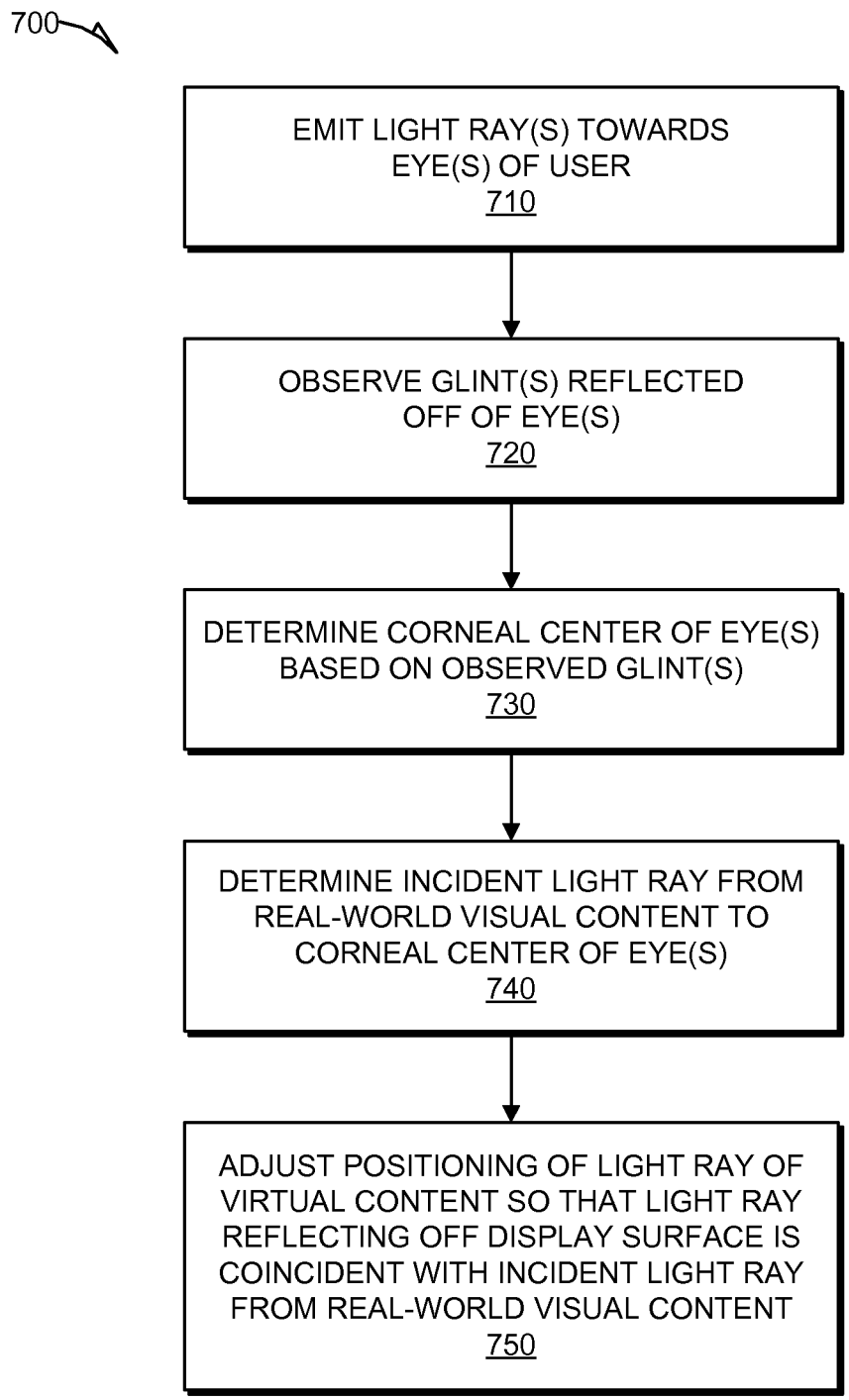
FIG. 7 is a flowchart illustrating a method of active parallax correction, in accordance with some embodiments.

FIG. 7 is a flowchart illustrating a method 700 of active parallax correction, in accordance with some embodiments. The operations of method 700 may be performed by a system or modules of a system (e.g., virtual content module 150 in FIGS. 1-2). At operation 710, one or more light rays can be emitted from at least one light emitting diode towards the eye(s) of a user. At operation 720, at least one glint reflected off of the at least one eye can be observed (e.g., captured or detected) using at least one camera. At operation 730, a corneal center of the at least one eye can be determined based on the observed glint(s). At operation 740, a path of incident light from the real-world visual content to the corneal center of the at least one eye can be determined. At operation 750, the positioning of at least one virtual content light ray forming the virtual content on the display surface can be adjusted to make at least one reflected light ray reflecting off of the display surface as a result of the virtual content light ray(s) coincident with the incident light ray from the real-world visual content. It is contemplated that the operations of method 700 may incorporate any of the other features disclosed herein.

Figure 8:
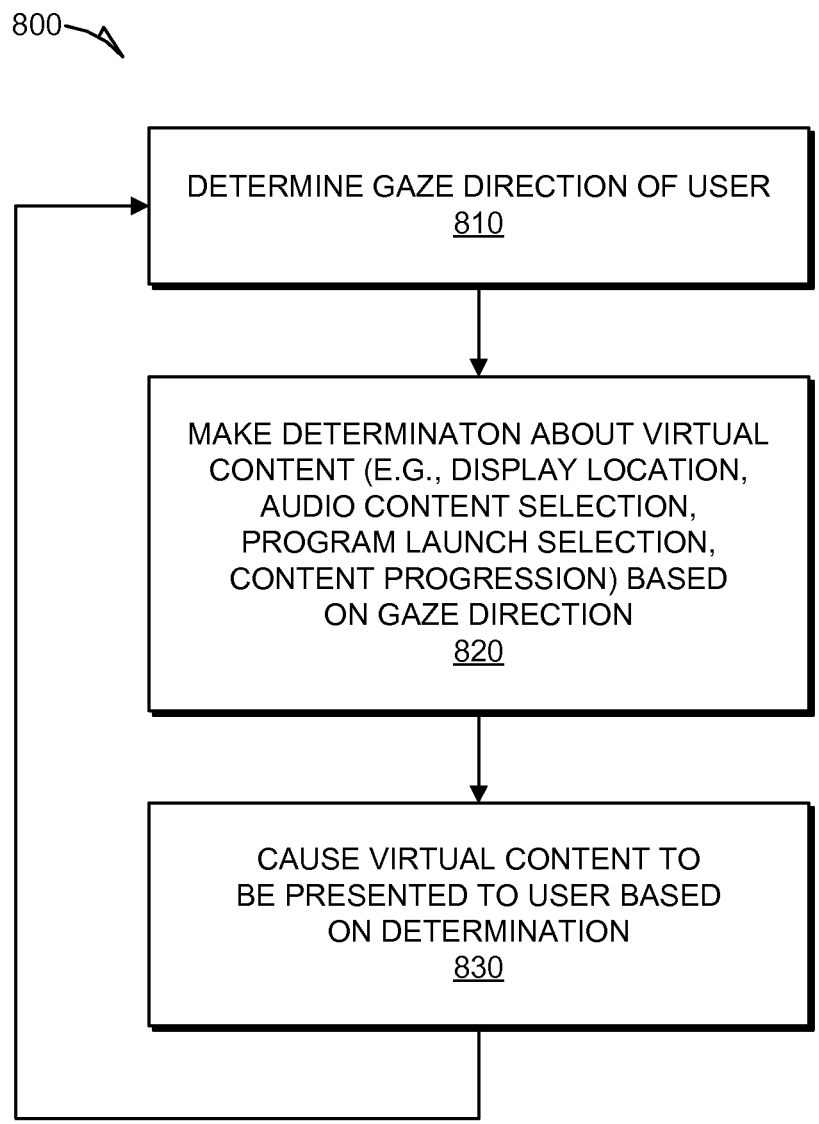
FIG. 8 is a flowchart illustrating a method of using a gaze direction in the presentation of virtual content to a user, in accordance with some embodiments.

In some embodiments, the determination of the gaze direction of the user can be used to make other determinations about virtual content to be presented to the user, in addition or as an alternative to the determination of the display location previously discussed. FIG. 8 is a flowchart illustrating a method 800 of using a gaze direction in the presentation of virtual content to a user, in accordance with some embodiments. The operations of method 800 may be performed by a system or modules of a system (e.g., virtual content module 150 in FIGS. 1-2). At operation 810, a gaze direction of at least one eye of a user can be determined, such as by using the eye tracking techniques disclosed herein or any other suitable eye tracking techniques.

At operation 820, a determination can be made about virtual content to be presented to the user. In some embodiments, the determination can include a determination of a display location of the virtual content, as previously discussed. In some embodiments, the determination can include a selection of audio content for presentation to the user (e.g., playing a song file on the computing device 100 being used by the user). In some embodiments, the determination can include a selection of a program to launch. In some embodiments, the determination can include a selection of a certain content progression to perform. In some embodiments, the determination can include a selection of haptic feedback to provide to the user. Other types of determinations about the virtual content are also within the scope of the present disclosure. In some embodiments, the determination at operation 820 can be made based on stored associations between different gaze directions and different virtual content determinations. For example, a plurality of audio files can be stored in a database, with each audio file corresponding to a particular gaze direction. This mapping of gaze directions to audio files can then be used to select an audio file for presentation to the user based on the determined gaze direction of the user. Other implementations and configurations are also within the scope of the present disclosure.

At operation 830, the virtual content can be presented to the user based on the determination that was made at operation 820. It is contemplated that the operations of method 800 may incorporate any of the other features disclosed herein.

In some embodiments, a calibration process is performed on the components of the computing device 100 prior to performance of the operations, such as prior to the performance of the operations of method 600 in FIG. 6, the operation of method 700 in FIG. 7, or the operations of method 800 in FIG. 8. This calibration process may comprise the calibration of any sensors, display surfaces, image capture devices, and projectors of the computing device 100 so that they are all synchronized, running off of the same clock, and knowing the attributes (e.g., location, positioning) of each other in order to facilitate their working together as a cohesive unit.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 214 of FIG. 2) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
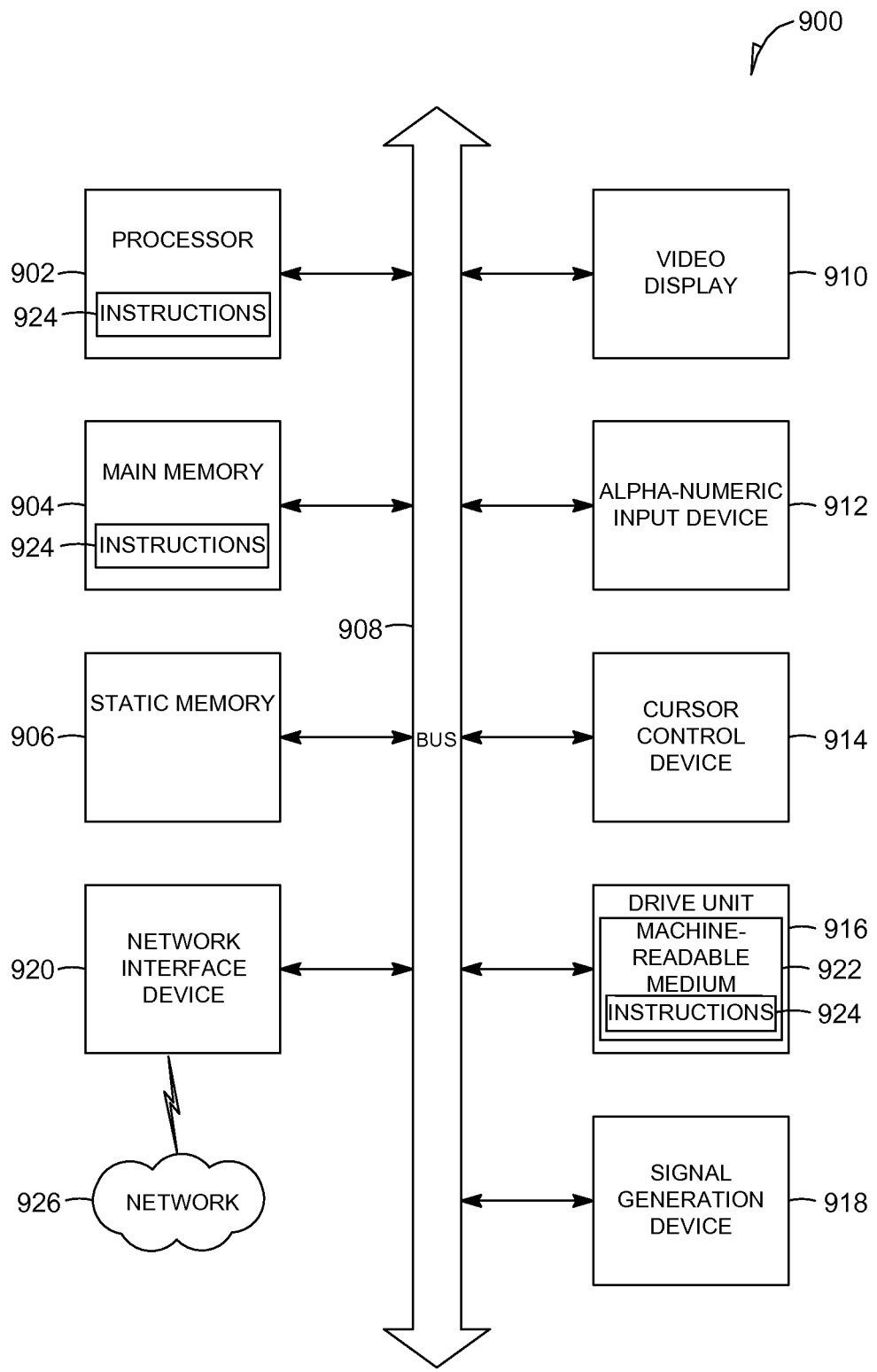
FIG. 9 is a block diagram of an example computer system on which methodologies described herein may be executed, in accordance with some embodiments.

FIG. 9 is a block diagram of a machine in the example form of a computer system 900 within which instructions 924 for causing the machine to perform any one or more of the methodologies discussed herein may be executed, in accordance with an example embodiment. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker) and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Example Mobile Device

Figure 10:
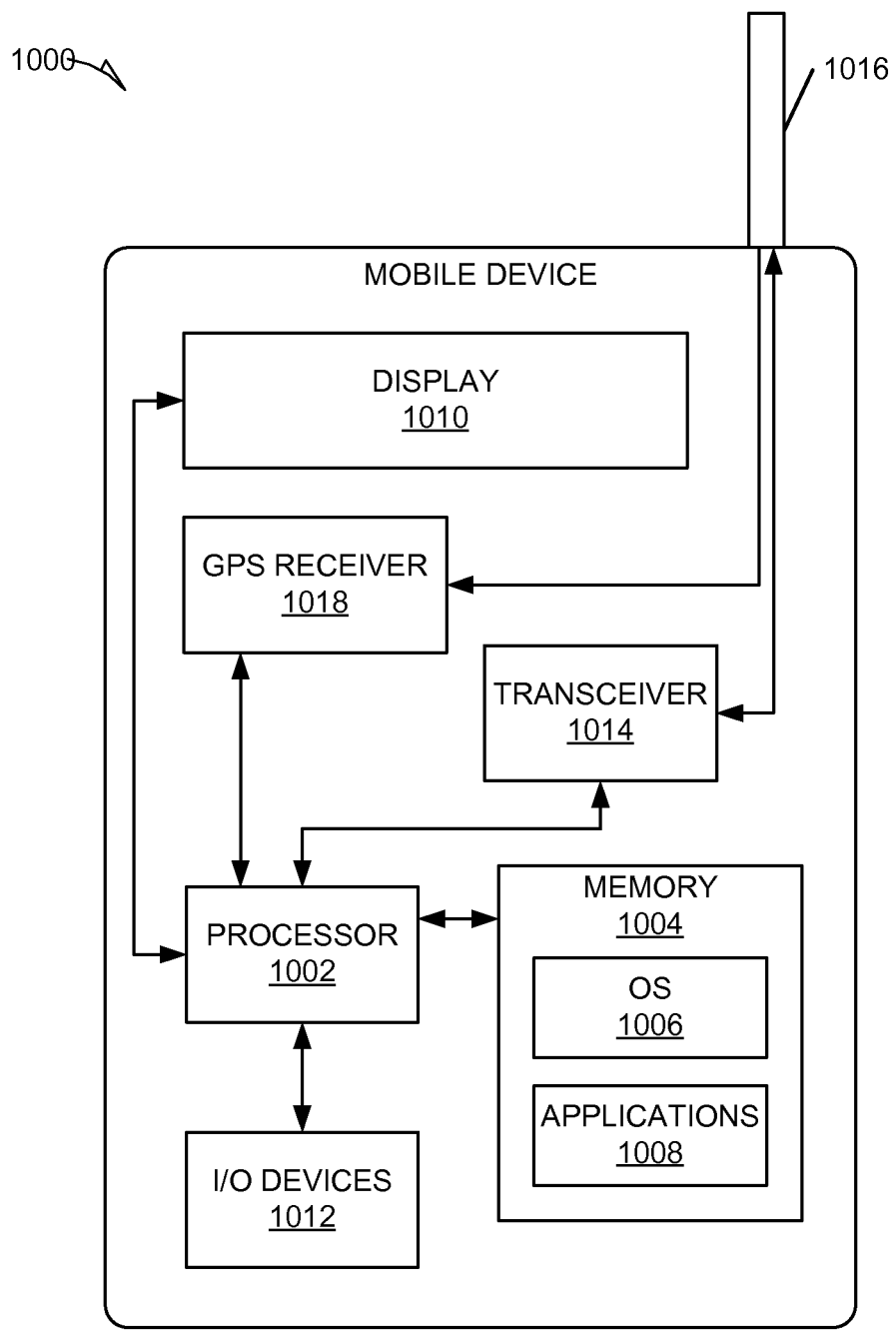
FIG. 10 is a block diagram illustrating a mobile device, in accordance with some embodiments.

FIG. 10 is a block diagram illustrating a mobile device 1000 that may employ the active parallax correction features of the present disclosure, according to an example embodiment. The mobile device 1000 may include a processor 1002. The processor 1002 may be any of a variety of different types of commercially available processors 1002 suitable for mobile devices 1000 (for example, an XScale architecture microprocessor, a microprocessor without interlocked pipeline stages (MIPS) architecture processor, or another type of processor 1002). A memory 1004, such as a random access memory (RAM), a flash memory, or other type of memory, is typically accessible to the processor 1002. The memory 1004 may be adapted to store an operating system (OS) 1006, as well as application programs 1008, such as a mobile location enabled application that may provide LBSs to a user 102. The processor 1002 may be coupled, either directly or via appropriate intermediary hardware, to a display 1010 and to one or more input/output (I/O) devices 1012, such as a keypad, a touch panel sensor, a microphone, and the like. Similarly, in some embodiments, the processor 1002 may be coupled to a transceiver 1014 that interfaces with an antenna 1016. The transceiver 1014 may be configured to both transmit and receive cellular network signals, wireless data signals, or other types of signals via the antenna 1016, depending on the nature of the mobile device 1000. Further, in some configurations, a GPS receiver 1018 may also make use of the antenna 1016 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment,

What is claimed is:

1. A computer-implemented method comprising:

receiving image data of real-world visual content, the image data having been captured by an image capture device;

determining virtual content based on the received image data;

determining a first gaze direction of at least one eye of a user;

making, by a machine having a memory and at least one processor, a determination about the virtual content based on the first gaze direction, the making the determination comprising determining a first location on a display surface at which to display the virtual content, the first location being determined using a first distance between the at least one eye of the user and a point at which the first gaze direction intersects with the display surface and a second distance between the real-world visual content and the point at which the first gaze direction intersects with the display surface as parameters;

causing the virtual content to be presented to the user based on the determination, the causing the virtual content to be presented comprising causing the virtual content to be displayed on the display surface at the first location, the virtual content displayed at the first location comprising a visual object;

determining a second gaze direction of the at least one eye of the user, the second gaze direction being different from the first gaze direction;

determining a second location on the display surface at which to display the virtual content, the second location being different from the first location and determined using a third distance between the at least one eye of the user and a point at which the second gaze direction intersects with the display surface and a fourth distance between the real-world content and the point at which the second gaze direction intersects with the display surface as parameters; and causing the virtual content to be displayed on the display surface at the second location, the virtual content displayed at the second location comprising the same visual object as the virtual content displayed at the first location, the causing of the virtual content to be displayed on the display surface at the second location comprising an adjustment of a display location of the virtual content from the first location to the second location based on a change in gaze direction of the user from the first gaze direction to the second gaze direction.

2. The method of claim 1, wherein determining the first location comprises:

emitting at least one light ray from at least one light emitting diode towards the at least one eye;

observing at least one glint reflected off of the at least one eye using at least one camera;

determining a corneal center of the at least one eye based on the observed at least one glint;

determining a path of incident light from the real-world visual content to the corneal center of the at least one eye; and adjusting positioning of at least one virtual content light ray forming the virtual content on the display surface to make at least one reflected light ray reflecting off of the display surface as a result of the at least one virtual content light ray coincident with the incident light ray from the real-world visual content.

3. The method of claim 1, wherein the display surface is transparent.

4. The method of claim 1, wherein the display surface and the image capture device are coupled to a heads-up display device.

5. The method of claim 4, wherein the heads-up display device comprises an optical head-mounted display device.

6. The method of claim 1, further comprising:

storing a plurality of audio files in a database, each one of the plurality of audio files being stored in association with a corresponding gaze direction;

selecting a first one of the audio files to be presented to the user based on the first gaze direction; and causing the selected first one of the audio files to be presented to the user.

7. The method of claim 1, wherein:

a first angle between the first gaze direction and a direction from which the second distance between the real-world content and the point at which the first gaze direction intersects with the display surface is measured is also used as a parameter in determining the first location; and a second angle between the second gaze direction and a direction from which the fourth distance between the real-world content and the point at which the second gaze direction intersects with the display surface is measured is also used as a parameter in determining the second location.

8. A system comprising:

an image capture device configured to capture image data of real-world visual content;

at least one processor; and a computer-readable medium storing executable instructions that, when executed, cause the at least one processor to perform operations comprising:

determining virtual content based on the captured image data;

determining a first gaze direction of at least one eye of a user;

making a determination about the virtual content based on the first gaze direction, the making the determination comprising determining a first location on a display surface at which to display the virtual content, the first location being determined using a first distance between the at least one eye of the user and a point at which the first gaze direction intersects with the display surface and a second distance between the real-world visual content and the point at which the first gaze direction intersects with the display surface as parameters;

causing the virtual content to be presented to the user based on the determination, the causing the virtual content to be presented comprising causing the virtual content to be displayed on the display surface at the first location, the virtual content displayed at the first location comprising a visual object;

determining a second gaze direction of the at least one eye of the user, the second gaze direction being different from the first gaze direction;

determining a second location on the display surface at which to display the virtual content, the second location being different from the first location and determined using a third distance between the at least one eye of the user and a point at which the second gaze direction intersects with the display surface and a fourth distance between the real-world content and the point at which the second gaze direction intersects with the display surface as parameters; and causing the virtual content to be displayed on the display surface at the second location, the virtual content displayed at the second location comprising the same visual object as the virtual content displayed at the first location, the causing of the virtual content to be displayed on the display surface at the second location comprising an adjustment of a display location of the virtual content from the first location to the second location based on a change in gaze direction of the user from the first gaze direction to the second gaze direction.

9. The system of claim 8, further comprising:

at least one light emitting diode configured to emit at least one light ray towards the at least one eye; and at least one camera configured to observe at least one glint reflected off of the at least one eye, wherein the operations further comprise:

determining a corneal center of the at least one eye based on the observed at least one glint, determining a path of incident light from the real-world visual content to the corneal center of the at least one eye, and adjusting a positioning of at least one virtual content light ray forming the virtual content on the display surface to make at least one reflected light ray reflecting off of the display surface as a result of the at least one virtual content light ray coincident with the incident light ray from the real-world visual content.

10. The system of claim 8, wherein the display surface is transparent.

11. The system of claim 8, wherein the display surface and the image capture device are coupled to a heads-up display device.

12. The system of claim 11, wherein the heads-up display device comprises an optical head-mounted display device.

13. A non-transitory machine-readable storage medium, tangibly embodying a set of instructions that, when executed by at least one processor, causes the at least one processor to perform a set of operations comprising:

receiving image data of real-world visual content, the image data having been captured by an image capture device;

determining virtual content based on the received image data;

determining a first gaze direction of at least one eye of a user;

making a determination about the virtual content based on the first gaze direction, the making the determination comprising determining a first location on a display surface at which to display the virtual content, the first location being determined using a first distance between the at least one eye of the user and a point at which the first gaze direction intersects with the display surface and a second distance between the real-world visual content and the point at which the first gaze direction intersects with the display surface as parameters;

causing the virtual content to be presented to the user based on the determination, the causing the virtual content to be presented comprising causing the virtual content to be displayed on the display surface at the first location, the virtual content displayed at the first location comprising a visual object;

determining a second gaze direction of the at least one eye of the user, the second gaze direction being different from the first gaze direction;

determining a second location on the display surface at which to display the virtual content, the second location being different from the first location and determined using a third distance between the at least one eye of the user and a point at which the second gaze direction intersects with the display surface and a fourth distance between the real-world content and the point at which the second gaze direction intersects with the display surface as parameters; and causing the virtual content to be displayed on the display surface at the second location, the virtual content displayed at the second location comprising the same visual object as the virtual content displayed at the first location, the causing of the virtual content to be displayed on the display surface at the second location comprising an adjustment of a display location of the virtual content from the first location to the second location based on a change in gaze direction of the user from the first gaze direction to the second gaze direction.

* * * * *